(12) United States Patent
Morris et al.

(10) Patent No.: US 9,037,301 B2
(45) Date of Patent: May 19, 2015

(54) METHOD AND APPARATUS FOR CONTROLLING A MULTI-MODE TRANSMISSION

(75) Inventors: Robert L. Morris, Milford, MI (US); Anthony H. Heap, Ann Arbor, MI (US); Shaochun Ye, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 13/483,082

(22) Filed: May 30, 2012

(65) Prior Publication Data

US 2013/0325184 A1    Dec. 5, 2013

(51) Int. Cl.
| | |
|---|---|
| *G06F 19/00* | (2011.01) |
| *B60W 10/02* | (2006.01) |
| *B60W 10/10* | (2012.01) |
| *B60W 10/115* | (2012.01) |
| *B60W 20/00* | (2006.01) |
| *B60W 30/18* | (2012.01) |
| *F16H 61/66* | (2006.01) |

(52) U.S. Cl.
CPC ............... *B60W 10/02* (2013.01); *B60W 10/10* (2013.01); *B60W 10/115* (2013.01); *B60W 20/00* (2013.01); *B60W 30/18* (2013.01); *F16H 61/66* (2013.01); *B60W 20/20* (2013.01); *F16H 2061/6602* (2013.01)

(58) Field of Classification Search
None
See application file for complete search history.

(56) References Cited

U.S. PATENT DOCUMENTS

| | | | |
|---|---|---|---|
| 5,534,764 A * | 7/1996 | Masaki et al. | 318/802 |
| 6,553,958 B1 * | 4/2003 | Kolmanovsky et al. | 123/295 |
| 7,099,762 B2 * | 8/2006 | Graf et al. | 701/54 |
| 7,645,206 B2 | 1/2010 | Holmes et al. | |
| 2007/0225887 A1 | 9/2007 | Morris | |
| 2007/0225889 A1 | 9/2007 | Morris | |
| 2010/0038158 A1 * | 2/2010 | Whitney et al. | 180/65.265 |
| 2010/0251707 A1 * | 10/2010 | Sah et al. | 60/486 |
| 2011/0029208 A1 * | 2/2011 | Xia | 701/58 |
| 2011/0054820 A1 * | 3/2011 | Sasaki et al. | 702/94 |

* cited by examiner

*Primary Examiner* — Sean Shechtman

(57) ABSTRACT

A powertrain system including a multi-mode transmission is configured to transfer torque among an input member, torque machines and an output member. A method for controlling the multi-mode transmission includes employing a closed-loop speed control system to determine torque commands for physical torque actuators including the torque machines. The closed-loop speed control system includes employing a virtual torque actuator control scheme to generate torque commands for the physical torque actuators responsive to output commands for a plurality of virtual torque actuators.

18 Claims, 3 Drawing Sheets

US 9,037,301 B2

METHOD AND APPARATUS FOR CONTROLLING A MULTI-MODE TRANSMISSION

TECHNICAL FIELD

This disclosure is related to torque transmission devices, including multi-mode transmissions employed in powertrain systems.

BACKGROUND

The statements in this section merely provide background information related to the present disclosure. Accordingly, such statements are not intended to constitute an admission of prior art.

Hybrid powertrain systems include torque generative devices, e.g., internal combustion engines and non-combustion motors that transfer torque through a transmission device to an output member that may be coupled to a driveline. Control systems for operating hybrid powertrain systems control torque outputs of the torque-generative devices and application of torque transfer elements in the transmission to transfer torque in response to operator-commanded output torque requests, taking into account fuel economy, emissions, driveability, and other factors.

SUMMARY

A powertrain system including a multi-mode transmission is configured to transfer torque among an input member, torque machines and an output member. A method for controlling the multi-mode transmission includes employing a closed-loop speed control system to determine torque commands for physical torque actuators including the torque machines. The closed-loop speed control system includes employing a virtual torque actuator control scheme to generate torque commands for the physical torque actuators responsive to output commands for a plurality of virtual torque actuators.

BRIEF DESCRIPTION OF THE DRAWINGS

One or more embodiments will now be described, by way of example, with reference to the accompanying drawings, in which:

FIGS. 2-1 and 2-2 illustrate lever diagrams representing inputs of physical torque actuators and virtual torque actuators, respectively, on a multi-mode transmission in accordance with the disclosure;

DETAILED DESCRIPTION

Figure 1:
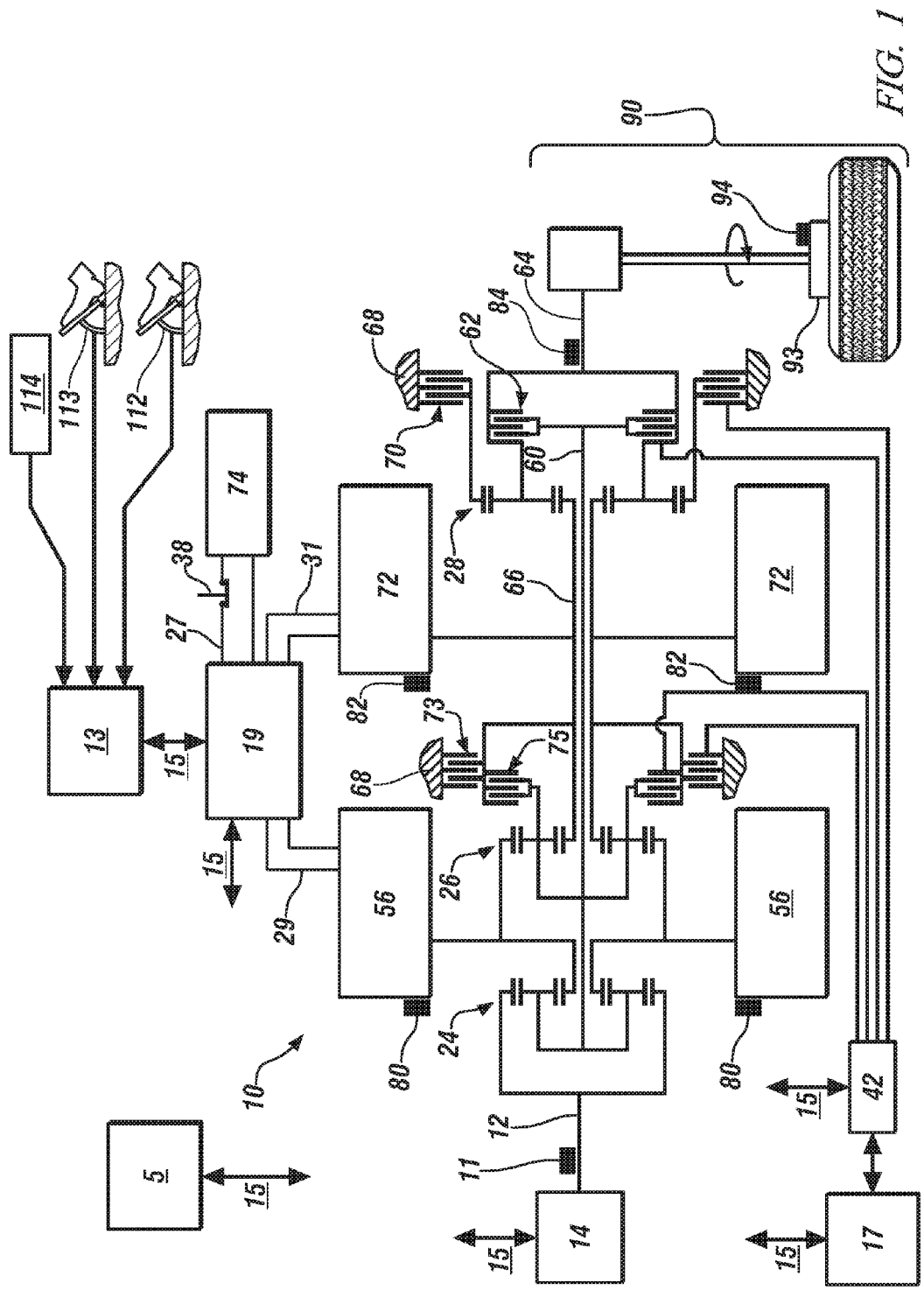
FIG. 1 illustrates a powertrain system including an internal combustion engine, a multi-mode transmission, a driveline, and a controller in accordance with the disclosure.

Referring now to the drawings, wherein the showings are for the purpose of illustrating certain exemplary embodiments only and not for the purpose of limiting the same, FIG. 1 depicts a non-limiting powertrain system including an internal combustion engine (engine) 14, a multi-mode transmission (transmission) 10, a driveline 90, and a controller 5. The transmission 10 mechanically couples to the engine 14 and a plurality of torque machines, and is configured to transfer torque between the engine 14, the torque machines, and the driveline 90. As illustrated, the torque machines include first and second torque machines 56 and 72 that are electric motor/generators in one embodiment.

The engine 14 may be any suitable combustion device, and includes a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors crank angle and rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission 10 that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board routines, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 10 is configured to operate in one of several states that can be described in terms of engine states including one of an engine-on state (ON) and an engine-off state (OFF), and transmission ranges including fixed gear and variable (EVT) modes, described with reference to Table 1, below.

TABLE 1

| Description | Engine State | Transmission Range | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |
| Neutral | ON/OFF | Neutral | — | |

The transmission ranges in Table 1 indicate the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Figures 1, 2:
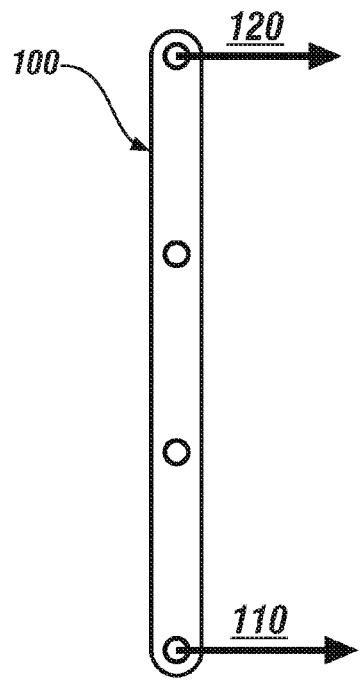
Figure 2:
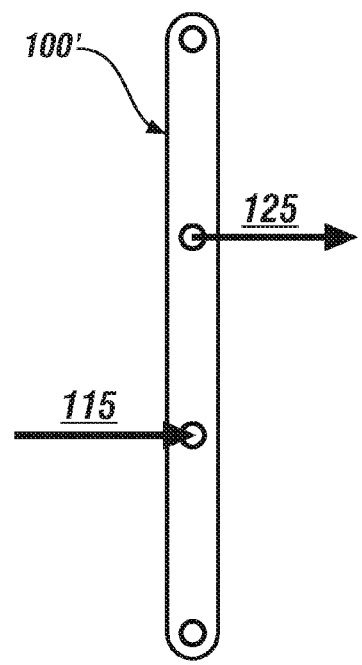

FIG. 2-1 schematically illustrates a first lever diagram 100 representing inputs of physical torque actuators on a multi-mode transmission operating in one of the EVT modes. The physical torque actuators are the first and second torque machines 56 and 72 for transmission 10, including first and second motor torque commands Ta 110 and Tb 120, respectively.

FIG. 2-2 schematically illustrates a second lever diagram 100' corresponding to the first lever diagram 100, and representing inputs of virtual torque actuators on a multi-mode transmission operating in one of the EVT modes. The virtual torque actuators are the input member 12 and the output member 64 for the exemplary transmission 10, including an input torque command Ti 115 and an output torque command To 125, respectively. The first and second lever diagrams 100 and 100' are used to develop system dynamics equations as follows.

The operation of the physical torque actuators may be described with a first system dynamics equation as follows:

$$x(k+1)=A*x(k)+B_{ab}*[u_{ab}(k)] \quad [1]$$

wherein A is an application-specific scalar vector;
x(k) is a response vector for the transmission;
$B_{ab}$ is an application-specific vector associated with the physical torque actuators; and
$u_{ab}(k)$ is a control vector associated with the physical torque actuators.

The operation of the virtual torque actuators may be described with a second system dynamics equation as follows:

$$x(k+1)=A*x(k)+B_{io}*[u_{io}(k)] \quad [2]$$

wherein A is the application-specific scalar vector;
x(k) is the response vector for the transmission;
$B_{io}$ is an application-specific vector associated with the virtual torque actuators; and
$u_{io}(k)$ is a control vector associated with the virtual torque actuators.

For a given system, the output or response vector x(k+1) from the virtual torque actuators (EQ. 2) is the same as the response vector x(k+1) from the physical torque actuators (EQ. 1), and thus the terms $B_{ab}[u_{ab}(k)]$ and $B_{io}[u_{io}(k)]$ are equivalent. Both of these terms may be multiplied as follows:

$$B_{ab}^T B_{ab}[u_{ab}(k)]=B_{ab}^T B_{io}[u_{io}(k)] \quad [3]$$

wherein $B_{ab}^T$ is the $B_{ab}$ term that has been transposed.
EQ. 3 may then be expressed as follows:

$$u_{ab}(k)=T_{io2ab}*u_{io}(k) \quad [4]$$

wherein $T_{io2ab}$ is a transfer function between the virtual torque actuators and the physical torque actuators. This transfer function, $T_{io2ab}$, may be defined in accordance with the following relationship.

$$T_{io2ab}=inv(B_{ab}^T B_{ab})B_{ab}^T B_{io} \quad [5]$$

Thus, $T_{ab2io}$, i.e., a transfer function between the physical torque actuators and the virtual torque actuators, may be defined in accordance with the following relationship.

$$T_{ab2io}=inv(T_{io2ab})$$

Feedback gains, $K_{ab}$ and $K_{io}$, may be defined in accordance with the following relationships.

$$K_{ab}=T_{io2ab}*K_{io} \quad [6]$$

$$K_{io}=T_{ab2io}*K_{ab} \quad [7]$$

TI input matrices may be defined in accordance with the following relationships.

$$B_{io}=B_{ab}*T_{io2ab} \quad [8]$$

$$B_{ab}=B_{io}*T_{ab2io} \quad [9]$$

Thus, the control vector for the physical torque actuators can be transformed to a control vector for the virtual torque actuators using a transformation matrix or transfer function, shown as follows:

$$u_{ab}(k)=T_{io2ab}*u_{io}(k) \quad [10]$$

wherein $T_{io2ab}=inv(B_{ab}^T B_{ab})B_{ab}^T B_{io}$

The transformation matrix or transfer function transforms the dynamic system from one which uses the physical motors as actuators to one which uses virtual torque actuators applied at selectable points in the driveline. These virtual torque actuators can be chosen such that they can be aligned with independent control functions of interest to the operator or such that they can be aligned with independent control functions of interest in the control system. This permits each of the control functions to be executed under its own constraints without affecting the output of the other control function, thus controlling one of the virtual torque actuators independently of the other virtual torque actuators. The illustration uses a transformation matrix or transfer function to transform between a control vector for the physical torque actuators and a control vector for the virtual torque actuators using physical torque actuators of the first and second torque actuators and virtual torque actuators of the input member and output member. Other transformation matrices or transfer functions can be developed to transform between a control vector for the physical torque actuators and a control vector for the virtual torque actuators, wherein the virtual torque actuators include selected ones of the input member, a selected clutch, the output member, and other actuators or nodes on a representative transmission lever diagram without limitation.

Figure 3:
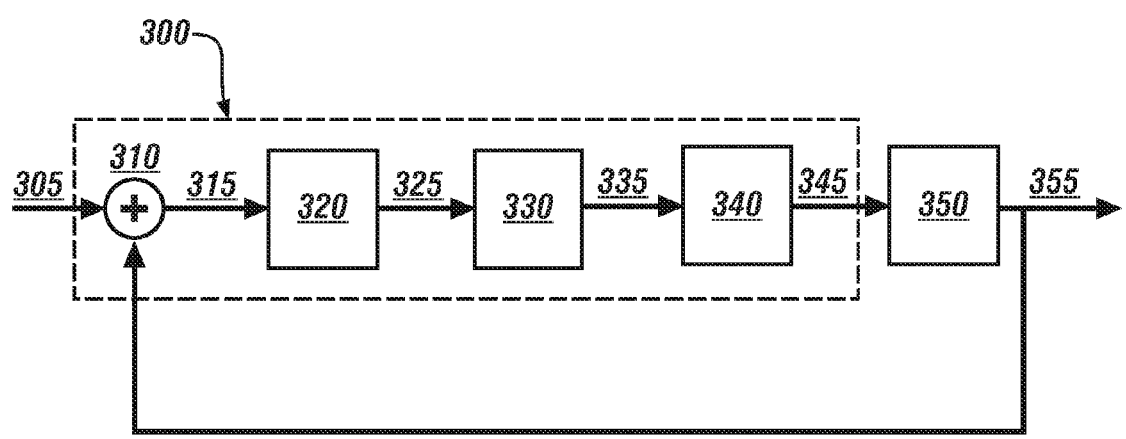
FIG. 3 illustrates implementation of a control scheme for controlling operation of an exemplary multi-mode transmission configured to transfer torque between an input member, torque machines and an output member in accordance with the disclosure.

FIG. 3 schematically shows implementation of a virtual torque actuator control scheme 300 for controlling operation of physical system 350, which is an exemplary multi-mode transmission configured to transfer torque between an input member, first and second torque machines and an output member in one embodiment. The virtual torque actuator control scheme 300 provides a mechanism to exercise coincident independent control of multiple virtual torque actuators. The virtual torque actuators represent selectable elements in the transmission or powertrain system that have an effect upon a discernible parameter that may be of interest to the vehicle operator. A virtual torque actuator is preferably selected to align with an independent control function, thus allowing each selected control function to be executed under its own constraints without affecting the output of the other virtual torque actuator. The discernible parameter may be temporal, i.e., only of interest for a period of time. Virtual torque actuators include, by way of example, the input member 12, which is of interest to effect input speed control during engine autostart and autostop operations, the output member 64, which is of interest to manage driveline damping, and clutch torque of one of the clutches, e.g., clutch C1 70, which is of interest for clutch slip control.

Overall the virtual torque actuator control scheme 300 transforms a dynamic system equation representing the transmission to a dynamic system equation representing the virtual torque actuators. The virtual torque actuators of the physical system 350 may include the input member 12, the output member 64, an applied clutch, or another torque node of interest in the multi-mode transmission, and an associated control vector that includes one or more of an input torque command Ti, an output torque command To, a clutch torque command $T_{C1}$, e.g., clutch C1 70, and another torque command associated with the transmission node of interest. Torque commands for the virtual torque actuators are determined, and are responsive to the output torque request and include driveline damping controls, closed-loop speed controls associated with engine autostart and autostop operations, and clutch torque controls. Torque constraints are applied to the torque commands for the virtual torque actuators to determine constrained torque commands for the virtual torque actuators. The constrained torque commands for the virtual torque actuators are transformed to torque commands for the physical system 350, which may include torque commands to control the physical torque actuators, i.e., the first and second torque machines 56 and 72. Thus, the first and second torque machines are controlled responsive to the torque commands for the virtual torque actuators.

This includes determining an input or command vector r(k) 305, which preferably includes a plurality of preferred or commanded speed and torque parameters associated with operation of the powertrain system, including preferred states for the transmission input speed Ni, the transmission output speed No, and the rotational speeds for first and second torque machines Na and Nb.

The command vector r(k) 305 is mathematically compared with a response vector x(k) 355 to generate an error vector e(k) 315. The response vector x(k) 355 includes a plurality of operating parameters associated with operation of the powertrain system including operating parameters associated with the virtual torque actuators including the transmission input speed Ni, the transmission output speed No, and the rotational speeds for first and second torque machines Na and Nb.

The error vector e(k) 315 is provided as an input to a first transfer function 320 that applies virtual control gains to the independent virtual torque actuators, as follows:

$$u_{io}(k)=K_{io}*e(k) \quad [11]$$

wherein $u_{io}(k)$ is a virtual actuator control vector; and
$K_{io}$ is a gain factor matrix for the independent virtual torque actuators.

The virtual actuator control vector $u_{io}(k)$ includes the torque commands for the virtual torque actuators of interest. In one embodiment the virtual actuator control vector includes torque commands associated with the input member and the output member, thus independently controlling outputs including speed control of the input member and damping control of the output member, i.e., $u_{io}(k)$=[Ti(speed control); To(damping)]. The control gains applied to the first transfer function 320 are designed relative to costs associated with the virtual torque actuators of interest and provide for independent control thereof.

The first transfer function 320 generates the virtual actuator control vector $u_{io}(k)$ 325, which is input to a virtual constraints function 330. The virtual constraints function 330 applies independently determined constraints to the virtual torque actuators by constraining the virtual actuator control vector $u_{io}(k)$ to generate a constrained virtual actuator control vector $u_{io}(k)'$ 335. The independently determined constraints may include constraints associated with closed-loop control of the speed of the input member for engine autostart and autostop operations, closed-loop control of the speed of the output member for driveline damping, or closed-loop control of clutch speed of one of the clutches.

The constrained virtual actuator control vector $u_{io}(k)'$ 335 is transformed to the physical realm using transfer function 340 in accordance with the following relationship:

$$u_{ab}(k)=T_{io2ab}*u_{io}(k)' \quad [12]$$

wherein $u_{ab}(k)$ represents the constrained physical actuator control vector 345 for the physical torque actuators including parameters of Ta and Tb; and
$T_{io2ab}$ represents a transfer function from the virtual torque actuators, i.e., the input member 12 and the output member 64, to the physical torque actuators, i.e., the first and second electric machines 56 and 72.

Thus, control of the physical system 350, i.e., control of the physical torque actuators of the electro-mechanical transmission 10 is achieved by applying the constrained physical actuator control vector 345 for the physical torque actuators including torque commands for the first and second motor torque commands Ta 110 and Tb 120, respectively, i.e., $u_{ab}(k)$, to the physical system 350 as represented using the aforementioned EQ. 1, which is repeated below. The physical system 350 generates the response vector x(k) 355.

$$x(k+1)=A*x(k)+B_{ab}*u_{ab}(k) \quad [13]$$

Figure 4:
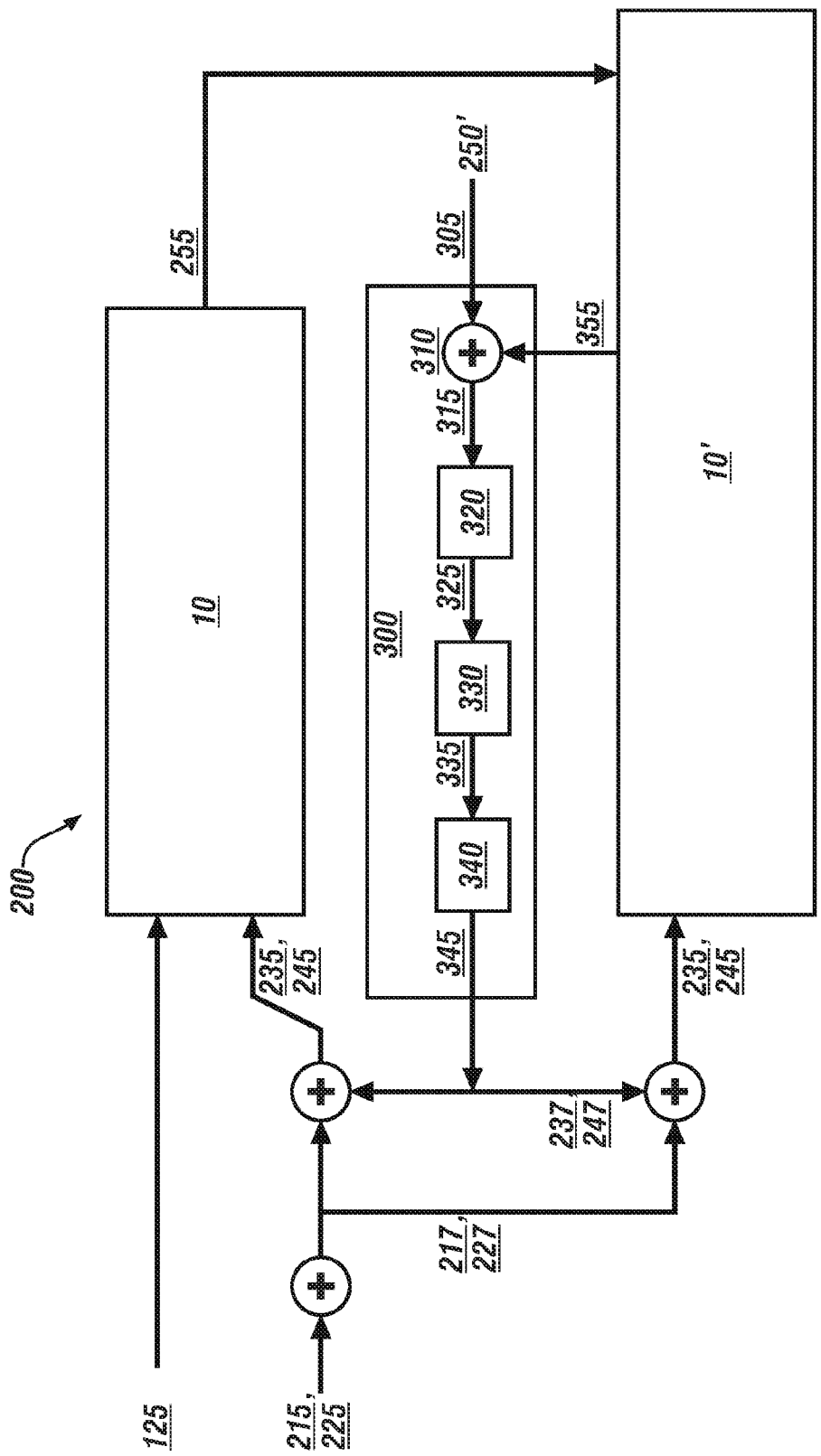
FIG. 4 illustrates a closed-loop speed control system configured to employ first and second transfer functions to control operation of the exemplary multi-mode transmission in accordance with the disclosure.

FIG. 4 schematically shows an embodiment of a closed-loop speed control system 200 that employs an embodiment of the virtual torque actuator control scheme 300 to control operation of an embodiment of the multi-mode transmission 10. The closed-loop speed control system 200 includes the aforementioned powertrain system 10, a powertrain system estimator 10', and the virtual torque actuator control scheme 300. The estimator 10' is configured to estimate various powertrain states, i.e., the operating parameters associated with operation of the powertrain system including the transmission input speed Ni, the transmission output speed No, and the rotational speeds for first and second torque machines Na and Nb contained in the response vector x(k) 355, based upon first and second final motor torque commands 235 and 245, respectively, and monitored delayed output states 255. The estimated powertrain states from the response vector x(k) 355 are compared to known state references preferably including the plurality of preferred or commanded operating parameters of the command vector r(k) 305.

Inputs to the closed-loop speed control system 200 include the open-loop motor torques Ta 215 and Tb 225, which are determined in response to an output torque request. The engine torque 125 is estimated. The open-loop motor torques Ta 215 and Tb 225 are combined with first and second torque command errors 237 and 247 to determine the first and second final motor torque commands 235 and 245 that are used to control the first and second torque machines 56 and 72. The virtual torque actuator control scheme 300 operates as described with reference to FIG. 3 to generate the constrained output control parameters for the physical torque actuators, i.e., $u_{ab}(k)$ 345, which includes parameters of Ta and Tb that are employed as first and second torque command errors 237 and 247, respectively. This is an iterative process, with the closed-loop speed control system 200 and all the associated elements and control schemes executed during one of the aforementioned loop cycles to determine the first and second final motor torque commands 235 and 245 that are used to control the first and second torque machines 56 and 72.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of a multi-mode transmission configured to transfer torque among an input member, torque machines and an output member, the method comprising:
    employing a closed-loop speed control system to determine torque commands for physical torque actuators comprising the torque machines, including employing a virtual torque actuator control scheme to generate the torque commands for the physical torque actuators to transfer torque to the multi-mode transmission, comprising:
        monitoring operating parameters associated with virtual torque actuators;
        determining an error vector associated with the monitored operating parameters;
        employing the virtual torque actuator control scheme to determine torque commands for virtual torque actuators responsive to an output torque request for the multi-mode transmission comprising employing a first transfer function operative upon the error vector to generate the torque commands for the virtual torque actuators;
        applying constraints to the torque command for the virtual torque actuator to generate a constrained virtual actuator control vector; and
        determining the torque commands to control the physical torque actuators responsive to the torque commands for the virtual torque actuators, comprising transforming the torque commands for the virtual torque actuators to torque commands to control the physical torque actuators by employing a second transfer function operative upon the constrained virtual actuator control vector to generate a constrained physical actuator control vector for the physical torque actuators comprising the torque commands to control the physical torque actuators.

2. The method of claim 1, wherein the virtual torque actuators comprises a transmission element having an effect upon a discernible operating parameter associated with an independent control function.

3. The method of claim 2, wherein the transmission element having an effect upon the discernible operating parameter associated with the independent control function comprises an input member of the multi-mode transmission.

4. The method of claim 2, wherein the transmission element having an effect upon the discernible operating parameter associated with the independent control function comprises an output member of the multi-mode transmission.

5. The method of claim 2, wherein the transmission element having an effect upon the discernible operating parameter associated with the independent control function comprises a torque-transfer clutch of the multi-mode transmission.

6. The method of claim 2, wherein the virtual torque actuators include an input member of the multi-mode transmission and an output member of the multi-mode transmission.

7. The method of claim 2, wherein the virtual torque actuators include an input member of the multi-mode transmission and a torque-transfer clutch of the multi-mode transmission.

8. The method of claim 1, wherein determining the error vector associated with the monitored operating parameters comprises comparing a command vector comprising a plurality of commanded parameters associated with the virtual torque actuators and a response vector comprising the monitored operating parameters associated with the virtual torque actuators.

9. Method for controlling operation of a multi-mode transmission configured to transfer torque among an input member, torque machines and an output member, the method comprising:
    employing a closed-loop speed control system to determine torque commands for physical torque actuators, including employing a virtual torque actuator control scheme to generate output control parameters for the physical torque actuators to transfer torque to the multi-mode transmission, comprising:
        monitoring operating parameters associated with the multi-mode transmission including an operating parameter associated with the virtual torque actuator;
        determining an error vector associated with the monitored operating parameters;
        employing the virtual torque actuator control scheme to determine a torque command for a virtual torque actuator responsive to a torque command for the multi-mode transmission comprising employing a first transfer function operative upon the error vector to generate the output command for the virtual torque actuator;
        applying constraints to the output command for the virtual torque actuator to generate a constrained virtual actuator control vector; and
        determining the torque commands to control the physical torque actuators responsive to the torque command for the virtual torque actuator, comprising transforming the torque command for the virtual torque actuator to a torque command to control the physical torque actuator by employing a second transfer function operative upon the constrained virtual actuator control vector to generate a constrained physical actuator control vector for the physical torque actuators comprising the torque commands for the physical torque actuators.

10. The method of claim 9, wherein the operating parameter associated with the virtual torque actuator comprises an input speed of an input member of the multi-mode transmission.

11. The method of claim 9, wherein the operating parameter associated with the virtual torque actuator comprises an output speed of an output member of the multi-mode transmission.

12. The method of claim 9, wherein the operating parameter associated with the virtual torque actuator comprises a clutch reactive torque of a torque-transfer clutch of the multi-mode transmission.

13. The method of claim 9, wherein employing the virtual torque actuator control scheme to generate output control parameters for the physical torque actuators comprises employing the virtual torque actuator control scheme to generate torque commands for the physical torque actuators to control driveline damping in the output member.

14. The method of claim 9, wherein employing the virtual torque actuator control scheme to generate output control parameters for the physical torque actuators comprises employing the virtual torque actuator control scheme to generate the torque commands for the physical torque actuators to control input speed of the input member.

15. The method of claim 14, wherein the torque commands are constrained and generated in response to an engine autostart command.

16. The method of claim 14, wherein the torque commands are constrained and generated in response to an engine autostop command.

17. The method of claim 14, wherein the torque commands are constrained and generated in response to a command to activate a selected torque transfer clutch.

18. Method for controlling operation of a multi-mode transmission configured to transfer torque among an input member, torque machines and an output member, the method comprising:
monitoring operating parameters associated with the multi-mode transmission including an operating parameter associated with a virtual torque actuator;
comparing a command vector comprising a plurality of commanded parameters associated with the virtual torque actuator to a response vector comprising the monitored operating parameters associated with the virtual torque actuator to determine an error vector;
employing a first transfer function upon the error vector to generate a torque command for the virtual torque actuator responsive to an output torque request for the multi-mode transmission;
applying constraints to the torque command for the virtual torque actuator to generate a constrained virtual actuator control vector;
employing a second distinct transfer function upon the constrained virtual actuator control vector to generate a constrained physical actuator control vector for physical torque actuators comprising torque command errors for the physical torque actuators; and
employing a closed-loop speed control system to determine torque commands for the torque machines that incorporate the torque command errors for the physical torque actuators.

* * * * *